United States Patent [19]

Yamamoto et al.

[11] 3,775,173
[45] Nov. 27, 1973

[54] METHOD OF MAKING AN ELECTROLUMINESCENT MATERIAL

[75] Inventors: Ryoichi Yamamoto, Neyagawa; Nobumasa Ohoshima, Hirakata; Hisanao Sato, Ibaragi; Hiroshi Kawarada, Neyagawa; Hiroshi Yamazoe, Osaka, all of Japan

[73] Assignee: Matsushita Electric Industrial Co., Ltd., Kadoma, Osaka, Japan

[22] Filed: June 1, 1971

[21] Appl. No.: 148,752

[52] U.S. Cl........... 117/201, 117/200, 252/62.3 ZT, 252/301.6 S
[51] Int. Cl............................ B44d 1/18, C09r 1/12
[58] Field of Search.................. 252/301.65, 301.45, 252/62.3 ZT; 117/33.5 E, 33.5 R, 113, 200, 201

[56] References Cited
UNITED STATES PATENTS

| | | | |
|---|---|---|---|
| 3,025,244 | 3/1962 | Aven............................ | 252/301.6 S |
| 3,607,771 | 9/1971 | Prener et al.................. | 252/301.6 S |

FOREIGN PATENTS OR APPLICATIONS

| | | | |
|---|---|---|---|
| 782,095 | 2/1954 | Great Britain................ | 252/301.6 S |

*Primary Examiner*—Oscar R. Vertiz
*Assistant Examiner*—J. Cooper
*Attorney*—Wenderoth, Lind & Ponack

[57] ABSTRACT

The present invention relates to an improved method for making an electroluminescent material for D.C. excited EL, comprising: immersing a powder material selected from the group consisting of ZnS, solid solution of ZnS and ZnSe and solid solution of ZnS and CdS in an aqueous solution having a concentration of copper salt of 0.001 to 0.1 mol/l at a temperature of 20°C to 90°C for a time period of 3 to 180 minutes, said powder material being activated with an activating amount of a member selected from the group consisting of Mn, Er and Tb, thereafter washing said powder material with pure water, and then drying said powder material.

1 Claim, 1 Drawing Figure

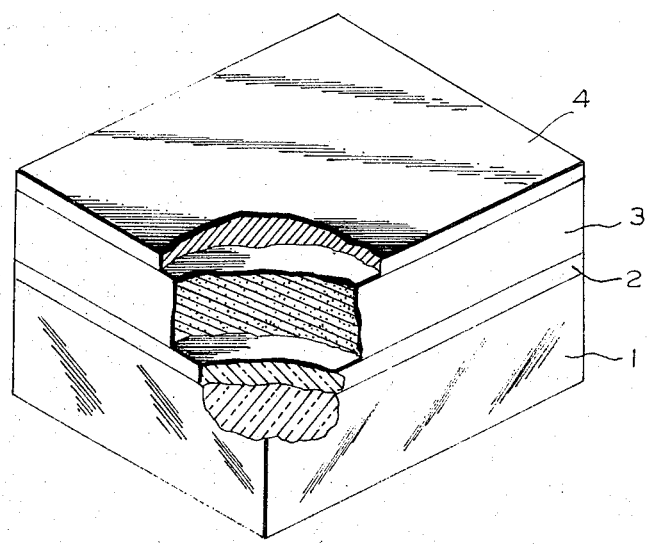
INVENTORS
RYOICHI YAMAMOTO
NOBUMASA CHOSHIMA
HISANAO SATO
HIROSHI KAWARADA
HIROSHI YAMAZOE

METHOD OF MAKING AN ELECTROLUMINESCENT MATERIAL

This invention relates to a method of making an electroluminescent material, and particularly to a method of making powder phosphor for direct current electroluminescence (DC-excited EL) comprising, as a host material, zinc chalcogenide or cadmium chalcogenide or solid solution thereof and, as an activator, transition metal or rare earth element.

An electroluminescent cell has a structure that a mixture of powder phosphor and dielectric material is sandwitched between two electrodes. In general, the powder phosphor includes ZnS, ZnSe, CdS, or solid solution thereof as a host material, and Cu, Ag, Mn, or rare earth element as an activator.

An EL cell excited with A.C. voltage includes phosphor particles which are insulated from the electrodes by the dielectric material and causes no D.C. current to flow therethrough. The number of mobile electrons in the phosphor particles per one cycle A.C. voltage is determined by a product of the electric capacitance of the cell and applied voltage. Brightness of the cell is proportional to a product of the number of mobile electrons and an operation frequency. As usual, AC-excited EL cell having copper-activated ZnS as a phosphor exhibits about 3 ft-Lamberts (ft-L) of brightness under an operation condition of 100 volts (rms) and 60 Hz. The satisfactory brightness of AC EL cell requires an applied voltage higher than 200 volts (rms) and an operation frequency higher than 1 kHz. However, the applied voltage and the electric capacitance available with the AC EL cell are practically limited.

An EL cell excited with D.C. voltage has a large amount of D.C. current passed therethrough and does not have such a limitation with regard to the number of mobile electrons as described with AC-excited EL. Therefore, there is a possibility in obtaining a DC EL cell with a higher brightness than that of an AC EL cell by employing activated phosphor which allows a sufficiently large current to pass therethrough. However, the phosphor powder commercially available for use in the AC EL cell has a high electrical resistance and does not allow a high D.C. current to flow therethrough.

An object of this invention is to provide a novel method of making powder phosphor capable of producing a high brightness DC-excited EL cell.

Another object of this invention is to provide a method for making powder phosphor having a p-type conducting layer formed on the surface thereof.

These and other objects of this invention will be apparent upon consideration taken together with an accompanying drawing, wherein FIG. 1 shows a cross sectional view of DC-excited EL cell comprising a phosphor layer which includes phosphor powder according to the present invention.

A method for making a material for DC-excited EL according to the present invention comprises immersing activated powder material selected from the group consisting of ZnS, solid solution of ZnS and ZnSe, and solid solution of ZnS and CdS in an aqueous solution of copper salt, thereafter washing said powder material with pure water and drying. So produced powder phosphor changes in the colour and has a surface layer of a p-type formed on the surface thereof. An existence of surface layer of a p-type is proved by a measurement of thermoelectric force of an aggregate of resultant phosphor powder according to the present invention elevates the brightness of DC-excited EL.

Aforesaid activated powder to be immersed in an aqueous solution of copper salt is preferably activated by manganese or rare earth element having an atomic number of 58 to 70, both including. The preferable effects of those activators can be understood by a fact that a dominant process in DC-excited EL is a collision excitation and those activators have atomic energy level, the energy difference of which are in the visible range of the spectrum.

Preferable copper salt which is included in aforesaid aqueous solution is either cuprous salt or cupric salt. The cuprous salt solution can be prepared by using a chemical reagent selected from the group consisting of cuprous chloride, cuprous bromide, and cuprous cyanide. In the case of cuprous chloride which has a very small solubility in water, an addition of HCl or (NH$_4$)OH into CuCl solution is preferable for formation of water soluble complex ion of copper: [CuCl$_2$]$^-$ or [Cu(NH$_3$)]$^-$. The cupric salt solution can be prepared by using a chemical reagent selected from the group consisting of cupric chloride, cupric sulfate, cupric bromide, cupric acetate, cupric nitrate, cupric carbonate, and cupric cyanide. In this case, it is not necessary to use any additives. Solvent of copper salt solution is not limitted to water, but also alcohol is applicable if necessary.

It has been discovered to the invention that the amount of the p-type layer formed on the surface of powder phosphor plays a dominant role for luminescent characteristics of the DC EL cell. The amount of p-type layer is controlled by the member of copper salt used in the solution, concentration of said copper salt, temperature of said solution, and immersing time. The DC EL cell having excellent characteristics is obtained with suitable combination of these factors. Preferable ranges of these factors are listed in Table 1.

TABLE 1

Temperature of Copper Salt Solution — 20° ~ 90°C
Immersing Time — 3 ~ 180 minutes
Concentration of Copper Salt in Solution — 0.001 ~ 0.1 mol/l The reaction velocity is different for different copper salt, different temperature of the solution, and different concentration of copper salt. A higher velocity is obtained with a cuprous salt solution and/or a higher temperature and/or a higher concentration of the copper salt solution and a lower velocity, with a cupric salt solution and/or a lower temperature and/or a lower concentration of the copper salt solution. More preferable condition for chemical treatment is listed in Table 2. The data in Table 2 are obtained when Mn-activated ZnS powder is immersed in an aqueous solution of cuprous chloride.

TABLE 2

Temperature of Cuprous Chloride Solution — 40° ~ 80°C
Immersing Time — 3 ~ 10 minutes
Concentration of Cuprous Chloride in Solution — 0.001 ~ 0.01 mol/l The particle size of powder phosphor has an effect on the brightness, stability, and resolution of the DC EL cell. A desirable particle size is smaller than 4 microns and the most part of said powder phosphor has a particle size ranging from 0.4 to 2 microns. The powder phosphor having the above particle size is produced in the following manner. In case of Mn-activated ZnS phosphor, $MnCl_2$ is added as an activator to the commercially available ZnS powder in phosphor grade having particle size below about 0.5 micron. An amount of $MnCl_2$ is adjusted in a way that the resultant ZnS powder doped with Mn after heating is in a composition of 0.1 to 0.5 wt % of Mn and 99.5 to 99.9 wt % of ZnS. Said mixture of ZnS and $MnCl_2$ is fired at a temperature of 800°C to 950°C for a time period of 1 to 2 hours in an inert gas such as nitrogen or argon. In case of rare earth-activated ZnS phosphor, an oxygen-free non-oxidizing ambient atmosphere such as $H_2S$ gas is used in firing.

The powder phosphor thus obtained exhibits photoluminescence characteristics of Mn or rare earth in ZnS crystal and is immersed in an aqueous solution containing copper ion. The ZnS powder changes in the colour from white to brown due to chemical reaction with copper ion. Then, the powder is washed with pure water, dried, and used for fabricating the DC EL cell. The measurement of thermoelectric force of an aggregate of the ZnS powder treated in the copper salt solution indicates that the brown coloured surface layer is of a p-type semiconductor. Since it is known that ZnS does not exsist in a p-type, the layer must be copper sulfide.

An fabrication of DC EL cell will be explained with reference to the FIGURE, wherein reference character 3 designates a phosphor layer prepared by applying, to a transparent electrode 2, phosphor paint explained hereinafter. The phosphor layer 3 is coated with a back electrode 4.

For example, the Mn-activated ZnS powder coated with a p-type layer is mixed with an organic bider paste including, for example, 82 wt % of urea resin and 18 wt % of solvent. The resultant mixture is referred as a phosphor paint. The weight ratio of binder paste to the phosphor is adjustable and is usually about two-thirds. The phosphor paint is applied to a transparent electrode 2, for example, a plate of tin oxide coated conducting glass 1 and is heated in a drying furnace to polymerize the urea resin at a curing temperature. The DC EL cell is obtained by applying a back electrode 4 of evaporated aluminum or colloidal graphite. The resultant phosphor layer 3 is about 10 microns in thickness. When a D.C. voltage is applied to this cell, current decreases with time and becomes nearly constant in several minutes after the voltage application. The intensity of light emission increases with a decrease in the current and approaches a constant value. This step is called a forming process. After the forming process, the EL cell shows a high brightness of the D.C. voltage excitation. The brightness of the DC EL cell including the powder phosphor according to this invention is usually 20 to 60 ft-L at 100 volts and 100 to several hundreds ft-L at 150 volts. For comparison, it is noticed that conventional AC EL cells ordinarily have a brightness of about 3 ft-L at 100 volts (rms) and about 40 ft-L at 200 volts (rms) for the frequency of 60 Hz. The essentially same results are obtained when ZnS as a host material is partially substituted with cadmium for zinc or with selenium for sulfur.

As described above, this invention provides a simple method of making efficient phosphor for DC-excited EL. In this method, it is possible to make phosphors having properties suitable for various practical applications, because the amount of the p-type surface layer is controllable by selecting an adequate combination of four important factors: the member of copper salt, the temperature of an aqueous solution of said copper salt, the concentration of copper salt in said solution, and the immersing time. The DC EL cell employing powder phosphor according to the invention has a higher contrast of image and a higher brightness that the conventional EL cell using conventional powder phosphor.

The following examples are given to illustrate certain preferred details of the invention and should not be construed as limitative.

EXAMPLE 1 p Commercially available ZnS powder (Phosphor Grade) and manganese chloride are mixed so that the resultant mixture is in a composition of 0.5 wt % of Mn and 99.5 wt % of ZnS. The mixture is fired at 900°C for 1 hour in nitrogen gas. The resultant powder phosphor exhibits a broad band photoluminescence centered at about 5850 angstroms due to Mn when subjected to ultra-violet excitation.

170 mg of cuprous chloride is dissolved in 1 cc of 10 normal HCl. Said hydrochloric solution is poured in 200 cc of deionized water for formation of an aqueous solution of cuprous chloride. 10 g of said powder phosphor is immersed in said aqueous solution at 70°C for 3 minutes. After filtering, washing with water, and drying the powder, one obtains the powder phosphor having a p-type thin layer coated thereon.

10 g of said chemically-treated phosphor and 7 g of urea resin is mixed to form a phosphor paint. Said phosphor paint is applied to a plate of tin oxide coated conducting glass by the use of a polyester mesh and heated at 160°C for 1 hour. A provision of a back electrode of evaporated aluminum completes a DC EL cell.

After the forming process carried out at 150 volts for about 1 minute, the cell yielded an output of 45 ft-L at 100 volts and 180 ft-L at 150 volts. The current density through the cell is about 25 mA/cm² at 100 volts.

EXAMPLE 2

Commercially available ZnS powder (Phosphor Grade) and manganese chloride are mixed so that the resultant mixture is in a composition of 0.4 wt % of Mn and 99.6 wt % of ZnS. The mixture is fired at 950°C for 1.5 hours in nitrogen gas.

0.14 g of cuprous chloride is dissolved in 1 cc of 10 normal HCl. Said hydrochloric solution of cuprous chloride is poured in 1,000 cc of deionized water for formation of an aqueous solution of cuprous chloride. 3 g of said powder phosphor is immersed in said aqueous solution at 60°C for 5 minutes and washed with pure water. A DC EL cell is fabricated in the similar manner to Example 1. After the forming process at 150 volts for about 1 minute, the brightness in said EL cell is 270 ft-L at 150 volts.

EXAMPLE 3

DC EL cells are fabricated in a manner similar to that of Example 2 except for the condition of the chemical treatment. Table 3 indicates the brightness of the resultant cells as a function of chemical treatment.

TABLE 3

| Temperature of Solution | Immersing Time | Concentration of CuCl | Brightness of the cell |
| --- | --- | --- | --- |

| (°C) | (min.) | (mol/l) | (ft-L) |
|------|--------|---------|--------|
| 20 | 120 | 0.1 | 120 |
| 40 | 10 | 0.01 | 240 |
| 60 | 3 | 0.0025 | 250 |
| 60 | 5 | 0.0014 | 270 |
| 80 | 5 | 0.001 | 220 |
| 90 | 3 | 0.001 | 100 |

It will be clear from Table 3 that a use of powder phosphor according to the invention produces a DC-excited EL cell having a high brightness.

EXAMPLE 4

Commercially available ZnS powder (Phosphor Grade), terbium chloride, and lithium chloride are mixed so that the resultant mixture is in a composition of 0.1 mol % of Tb, 0.1 mol % of Li, and 99.8 mol % of ZnS. The mixture is fired at 1100°C for 4 hours in $H_2S$ gas. The resultant powder phosphor exhibits a photoluminescence which peaks at about 5470 Angstroms. A DC EL cell is fabricated in a manner similar to that of Example 1 by using so produced powder phosphor and provided with an output of of 2 ft-L at 100 volts.

EXAMPLE 5

Commercially available ZnS powder (Phosphor Grade), erbium chloride, and lithium chloride are mixed so that the resultant mixture is in a composition of 0.3 mol % of Er, 0.3 mol % of Li, and 99.4 mol % of ZnS. The mixture is fired at 950°C for 8 hours in $H_2S$ gas. The resultant powder phosphor exhibit a photoluminescence which peaks at about 5250 Angstroms. A DC EL cell is fabricated in a manner similar to that of Example 1 by using so produced powder phosphor and provided with an output of 5 ft-L at 100 volts.

EXAMPLE 6

160 mg of cupric sulfate is dissolved in 200 cc of deionized water for formation of an aqueous solution of cupric sulfate. 10 g of Mn-activated ZnS powder prepared in the manner as describdd in Example 1 is immersed in said aqueous solution of cupric sulfate at 50°C for 60 minutes. Then, said powder is washed with pure water and dried. A DC EL cell is fabricated in a manner similar to that of Example 1 by using so prepared powder phosphor and provided with an output of 30 ft-L at 100 volts and 200 ft-L at 150 volts.

EXAMPLE 7

100 mg of cupric acetate is dissolved in 200 cc of deionized water for formation of an aqueous solution of cupric acetate. 10 g of Mn-activated ZnS powder prepared in the manner as described in Example 1 is immersed in said aqueous solution of cupric acetate at 70°C for 180 minutes. Then, said powder is washed with pure water and dried. A DC EL cell is fabricated in a manner similar to that of Example 1 by using so prepared powder phosphor and provided with an output of 60 ft-L at 100 volts and 700 ft-L at 200 volts.

What we claim is:

1. A method of making an electroluminescent material for D.C. excited EL, comprising: immersing ZnS activated with Mn in an aqueous solution of cuprous chloride, the concentration of which is 0.001 to 0.01 mol/l the temperature is 40° to 80°C and the time of immersion is 3 to 10 minutes, thereafter washing said ZnS activated with Mn with pure water, and then drying said ZnS activated with Mn.

* * * * *